Patented Sept. 28, 1937

2,094,085

UNITED STATES PATENT OFFICE 2,094,085

POLYMERCURATED AROMATIC HYDROCARBONS

Frederick Lawrence Sharp, Blackley, Manchester, England, assignor to Imperial Chemical Industries Limited, a corporation of Great Britain No Drawing. Application July 31, 1933, Serial No. 683,093. In Great Britain August 4, 1932

4 Claims. (Cl. 260—13)

This invention relates to mercurated benzene homologues of the general formula $R(HgOOCH_3)n$, wherein R represents a hydrocarbon nucleus of homologue of benzene such as toluene, xylene, mesitylene, cymene, etc., or the isomers thereof, and $n$ represents an integer equal to the number of mercury atoms.

The mercuration of aromatic hydrocarbons by means of mercuric acetate and the application of the mercurated compounds, diluted with some inert material, as seed disinfectants is well known. It has previously been the practice to effect the mercuration in the case of toluene by employing mercuric acetate and a large excess of hydrocarbon—the toluene usage being five times the weight of mercuric acetate (Coffey, Journal of the Chemical Society, 127, 1925, 1029). In order to avoid the use of such a large excess of the hydrocarbon the carrying out of the reaction in the presence of high boiling solvents such as nitrobenzene and o-dichlorobenzene has been suggested (British Specification No. 325,266). It has also been shown that the reaction proceeds at a temperature of 85–95° in the presence of a large excess of glacial acetic acid (about 70 molecules of acid to 1 molecule of mercury salt. See British Specification No. 325,846).

But even according to the process of the above cited specifications the amount of hydrocarbon used varies from 9 to 16 molecular proportions to one molecular proportion of mercury compound, that is to say it is still in large excess. It is accordingly permissible to assume that the resulting products are mainly monomercurated compounds probably contaminated with a small proportion of polymercuri compounds (Coffey, Journal of the Chemical Society, 127 (1925) p. 1030, 1031).

I have now discovered that mercuration of toluene and its higher homologues such as xylene and cymene, can be readily effected by the use of an aqueous solution of mercuric acetate (which may be prepared in situ from mercuric oxide and aqueous acetic acid).

It has not been known prior to the invention that the mercuration of aromatic hydrocarbons can be effected in the presence of an aqueous solvent. The employment of such a solvent is technically advantageous as will be clear to those skilled in the art.

Furthermore, I have discovered that working with aqueous solutions of reagent as above described it is possible to effect reaction with an approximately theoretical quantity instead of a large excess of hydrocarbon.

Thus, for instance, I may take one molecular proportion of mercuric oxide, two and one half molecular proportions of acetic acid, in the form of approximately 60% aqueous solution, or one molecular proportion of mercuric acetate and one half molecular proportion of acetic acid and cause such a mixture to interact with one third to one molecular proportion of toluene.

When one molecular proportion of toluene is used the known tolyl mercuriacetate is obtained; whereas when one third to one half molecular proportion of toluene is used I obtain what I believe to be mainly or wholly polymercurated derivatives of toluene, i. e. compounds wherein toluene has undergone substitution by more than one atom of mercury. The production of substances consisting wholly or mainly of such highly mercurized hydrocarbons is a particular feature of the invention.

For application as dry seed-disinfectants the mercurated hydrocarbons are mixed with a suitable diluent, for instance talc. The so-obtained disinfectants in so far as the active ingredient therein consists mainly of polymercurated hydrocarbon have the following desirable characteristics.

1. They are almost free from tendency to dust, i. e. the polymercurated compounds are good anti-dust agents.
2. They adhere well to the treated seed.
3. The flow rate of the treated seed from the drill is not impeded and is similar to that of untreated seed.

The following examples illustrate but do not limit the invention. The parts are by weight.

Example 1

432 parts of mercuric oxide, 300 parts of glacial acetic acid and 180 parts of water are stirred together and heated together until all the oxide has dissolved. 93 parts of toluene are then added and the mixture is stirred and heated at 85–87° C. under a reflux condenser for about 12 hours. Tests are made from time to time by adding aqueous caustic soda to a test portion of the mixture; when no yellow precipitate is obtained the interaction is deemed to be complete. There is thus obtained an aqueous solution of what appears to be chiefly diacetoxymercuri-toluene. This is then thoroughly incorporated with 25,000 parts of talc, tinted if desired by adding a suitable pigment such as iron oxide, dried and ground. The seed disinfectant dust thus obtained is applied in the dry condition in any convenient known manner to the seeds or tubers to be treated. For instance two ounces per bushel is applied to oats. The so-treated seed flows freely from a drill, is not dusty, and germinates as well as untreated seed. Whereas untreated seed shows on growth a percentage of stripe infested plants of about 11; the treated seed shows a percentage of less than 1.

Instead of using the aqueous solution directly for mixing with e. g., talc, the mercurated toluene may be separated by evaporation. The substance thus obtained is a white solid which is ground with 25,000 parts of talc.

*Example 2*

A mixture of 86.4 parts of yellow mercuric oxide, 60 parts of glacial acetic acid, 36 parts of water, and 21.2 parts of commercial xylol is treated as described in Example 1 (or the mixture may be made all at once and heated directly) for about 12 hours. A seed disinfectant is made from the solution as described in Example 1.

Pure m-xylene may be used instead of commercial xylol with similar results.

*Example 3*

A mixture of 86.4 parts of yellow mercuric oxide, 60 parts of glacial acetic acid, 36 parts of water and 26.8 parts of commercial cymene having a boiling point of 174 to 176° C. is treated as in Example 2. In this case a pale brown solid product separates from solution and is filtered off. This contains about 76% of mercury. It is mixed with talc to give a seed disinfectant having the same valuable properties as those of the preceding examples.

The invention is not limited to the specific proportions of the materials described in the examples. Although the primary purpose of the invention is the production of mercurized aromatic hydrocarbons (other than mercurized benzenes) by a technically simple and advantageous method, it is also contemplated to product ingredients for new and improved seed disinfectants, said ingredients consisting of or containing as described, polymercurated aromatic hydrocarbons (other than polymercurated benzenes). The aromatic hydrocarbon, it will be understood may be toluene, ortho-, meta- or para-xylene, ethyl benzene, pseudo-cumene, mesitylene, cymene or the like.

As many apparently widely different embodiments of the invention may be made without departing from the spirit and scope thereof, it is to be understood that I do not limit myself to the specific embodiments thereof except as defined in the following claims.

I claim:

1. As a new ingredient for dry seed disinfectants, acetoxy polymercurated toluene.

2. Diacetoxymercuri-toluene.

3. A polymercury derivative of homologues of benzene in which the mercury atom is attached directly to the ring, represented by the formula $R(HgOOCH_3)n$, wherein R represents a hydrocarbon nucleus of a homologue of benzene, and $n$ is an integer equal to the number of Hg atoms.

4. A polymercurated organic compound represented by the formula $R(HgOOCH_3)n$, and in which the mercury atom is attached directly to the ring, wherein R is of the group consisting of toluene, xylene, mesitylene, cymene, or the isomers thereof, and $n$ is an integer equal to the number of Hg atoms.

FREDERICK LAWRENCE SHARP.